Nov. 6, 1956     E. A. ARP     2,769,287
VALVE SEAT GRINDER
Filed Aug. 31, 1955
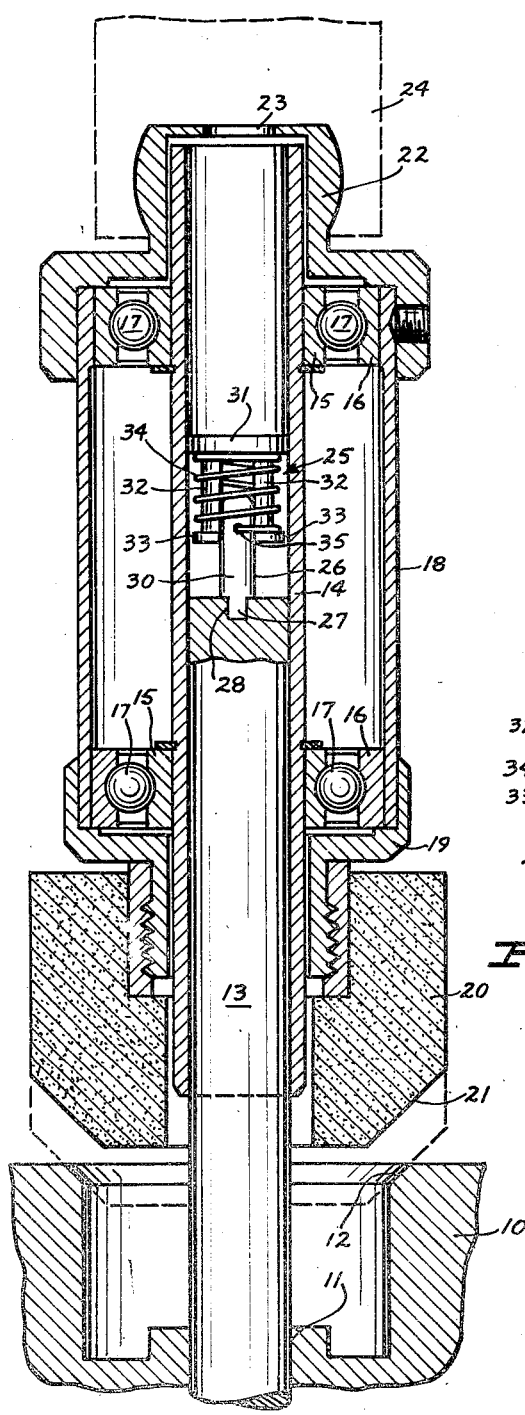
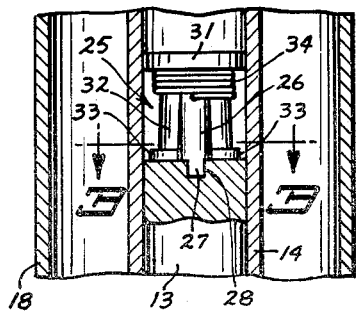
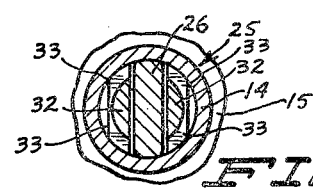
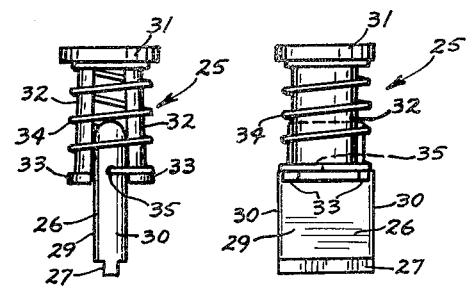
INVENTOR.
EWALD A. ARP
BY
Braddock and Braddock
ATTORNEYS

United States Patent Office 2,769,287
Patented Nov. 6, 1956

2,769,287

VALVE SEAT GRINDER

Ewald A. Arp, Minneapolis, Minn., assignor to Tobin-Arp Manufacturing Company, Minneapolis, Minn., a corporation of Minnesota Application August 31, 1955, Serial No. 531,792

13 Claims. (Cl. 51—241)

The invention herein has relation to a valve seat grinder of the kind and for the purpose as disclosed in Patent No. 2,525,119, to Allen I. Dunn, granted October 10, 1950, and has for its object to provide a valve seat grinder wherein will be incorporated novel and improved features and characteristics of construction.

In the accompanying drawing forming a part of this specification,

Fig. 1 is a longitudinal sectional view of a valve seat grinder made according to the invention;

Fig. 2 is a fragmentary sectional view corresponding generally with the disclosure of Fig. 1 but showing parts of the valve seat grinder in different positions;

Fig. 3 is a detail sectional view, taken as on line 3—3 in Fig. 2;

Fig. 4 is a side elevational view of a lifter device of the valve seat grinder removed therefrom; and Fig. 5 is a side elevational view of said lifter device as it would appear from the left in Fig. 4.

A cylinder block 10 provides a bore 11 for a valve stem (not shown), and also provides a valve seat 12, to be operated upon by the valve seat grinder, in concentric relation to the bore 11.

An arbor 13 of the valve seat grinder is removably, tightly fitted in the bore 11 and extends to position above the cylinder block in Fig. 1 of the drawing in perpendicular relation to the valve seat 12. As disclosed, the arbor 13 is of cylindrical configuration.

An inner sleeve 14 of the grinder assembly of the valve seat grinder is mounted on the arbor 13 for longitudinal and rotational movement. Each of spaced ball bearings includes an inner annular element 15 fixed on the exterior surface of the inner sleeve 14, an outer annular element 16 and usual balls 17 between said inner and outer annular elements. The outer annular element 16 of each ball bearing is fixed to the internal surface of an outer shell 18 of said grinder assembly concentric with the inner sleeve 14.

The lower end of the outer shell 18 fixedly supports a nipple 19, and said nipple in turn fixedly supports a rotary grinder 20 in concentric relation to the inner sleeve 14 and the outer shell 18 of the grinder assembly. The lower end of the rotary grinder 20 has a conical face 21 which is appropriately tapered for proper re-grinding of the valve seat 12.

The upper end of the outer shell is rigid with a cap 22 constituting a driving head for accomplishing rotation of the outer shell 18 and the rotary grinder 20, and a central opening 23 through said cap or driving head is longitudinally alined with the arbor 13. An upper portion of the cap or driving head 22 desirably will be of angular configuration in cross section, and a coupling socket 24, shown in dotted lines in Fig. 1, projecting from the output shaft of a driving motor (not shown) is of configuration to drivingly fit said upper portion of said cap or driving head. Said outer shell and rotary grinder will be rotated at high speed in response to high speed rotation of the coupling socket 24.

A lifter device 25 situated in the inner sleeve 14 above the arbor 13 constitutes a construction and arrangement, or means, of the valve seat grinder both for adjustably setting the grinder assembly at an appropriate level to enable the rotary grinder 20 to engage the valve seat 12 in response to forcing the coupling socket downwardly, and for lifting said grinder assembly and removing said rotary grinder from said valve seat when downward pressure upon said coupling socket is discontinued.

A base member of the lifter device 25 is constituted as an elongated bar 26 having a bit 27, for entry in a transverse slot 28 in the upper end of the arbor 13, extending downwardly therefrom. Opposite side surfaces 29, 29 and 30, 30, respectively, of the elongated bar 26 are in parallel relation.

A head member of said lifter device is constituted as a generally U-shape element including an end piece 31, of disc shape as shown, and diverging, spaced limbs 32, 32 integral with and extending downwardly from a lower surface of said end piece. The lower end of each of said spaced limbs integrally supports one or more outwardly extending friction elements or flanges 33 for engagement with an internal surface of the inner sleeve 14. The spaced limbs 32 are of more or less resilient material, desirably metal, and friction elements or flanges 33 are in diametrically opposed relation transversely of the lifter device 25.

The elongated bar 26 of the base member of said lifter device is slidably fitted between the spaced limbs 32 of the head member, and a compression coil spring 34, in surrounding relation to said spaced limbs, normally urges said base member and said end piece 31 away from each other. An upper end of the compression coil spring is engaged against a lower surface of the end piece, and a lower end of said compression coil spring is secured in an aperture 35 in an end surface 30 of the elongated bar 26. A lower end portion of the compression spring normally engages an upper surface of one or more of the friction elements or flanges 33.

The lifter device 25 is adjustable longitudinally of the inner sleeve 14, and the spaced limbs 32 are initially set at predetermined distance apart to insure that the friction elements or flanges 33 will pressingly engage the internal surface of said inner sleeve, as clearly disclosed in Fig. 3, under sufficient pressure to insure that the head member will remain fixed, during operation of the valve seat grinder, at any position to which adjusted along the inner sleeve.

In Fig. 1 of the drawing, the base member is shown as when resting on the upper end of the arbor 13 with the bit 27 situated in the transverse slot 28. Also in said Fig. 1, the friction elements or flanges 33 are pressingly engaged against the internal surface of the inner sleeve 14 and the compression coil spring 34 is expanded, the weight of the valve seat grinder is supported on said compression coil spring itself engaged beneath the end piece 31 and secured to the elongated bar 26 of the base member, and the rotary grinder 20 is in spaced relation to the valve seat 12. The parts of the lifter device will be situated substantially as in Fig. 1 before the commencement of each grinding operation. During grinding operations the head member will be at its closest possible position relative to the base member and the compression coil spring 34 will be collapsed, as in Fig. 2; and, too, said rotary grinder will be engaged against the valve seat.

The lifter device and the parts thereof can be adjustably set at proper position for any grinding operation which is to be accomplished merely by placing said lifter device in a lower portion of the inner sleeve 14 and causing it to be pushed upwardly by the arbor in response to sliding of said inner sleeve downwardly upon said arbor, or by pushing the end piece 31 of the head member, and thus the lifter device, downwardly in an upper portion of said inner sleeve until the base member rests upon said arbor. The opening 23 in the cap or driving head 22 is for convenience of inserting an elongated tool (not shown) for pushing the lifter device downwardly. The inner sleeve 14, together with the lifter device as a unit, can be readily and easily rotated on the arbor 13 to cause the bit 27 to become alined with and enter the transverse slot 28.

The force necessary to adjustably move the friction elements or flanges 33 of the head member of the lifter device longitudinally of the inner sleeve 14 will be greater than the force exerted by the compression coil spring 34, supporting the weight of the valve seat grinder, to an extent insuring that said head member will remain in fixed position in said inner sleeve during each grinding operation. With downward movement of the grinder assembly and the head member as a unit, from the position as in Fig. 1 to substantially the position as in Fig. 2, in response to pressure exerted upon or at the coupling socket 24, the coil spring becomes compressed between the elongated bar of the base member, rested on the arbor 13, and the end piece 31, integral with the spaced limbs 32 and the friction elements or flanges 33. Upon release of the grinder assembly, whenever grinding is to be discontinued, said coil spring will react to elevate the head member and grinder assembly as a unit, from the position as in said Fig. 2 to the position as in said Fig. 1.

Rotary movement of the inner sleeve 14 will be prevented during rotation of the outer shell 18 and the rotary grinder 20 by reason of the fact that the friction elements or flanges of the head member are frictionally engaged against oppositely disposed portions of the internal surface of the inner sleeve and the bit of the base member is fitted to the transverse slot in the arbor.

What is claimed is:

1. In a grinder to be applied to a centering arbor when grinding a valve seat or the like, coaxial with the arbor, the combination with a sleeve having a bore fitting freely over said arbor and a rotary grinder mounted for rotation on said sleeve, of a lifter device received within the bore of said sleeve comprising a base member adapted to rest against said arbor, a spring on said base member and a head member including a surface against which said spring thrusts and spaced limbs rigid with said surface and at opposed sides of said base member having means for maintaining pressure against an internal surface of said bore.

2. In a grinder to be applied to a centering arbor when grinding a valve seat or the like, coaxial with the arbor, the combination with a sleeve having a bore fitting freely over said arbor and a rotary grinder mounted for rotation on said sleeve, of a lifter device received within said bore comprising a base member adapted to rest against said arbor and be fixed against rotation relative thereto, a spring on said base member, and a head member including a surface against which said spring thrusts and spaced limbs rigid with said surface and at opposed sides of said base member having means for maintaining pressure against oppositely disposed portions of an internal surface of said bore.

3. The combination as specified in claim 2 wherein said base member includes a bit for entry into a slot in the end of said arbor.

4. In a grinder to be applied to a centering arbor when grinding a valve seat or the like, coaxial with the arbor, the combination with a sleeve having a bore fitting freely over said arbor and a rotary grinder mounted for rotation on said sleeve, of a lifter device received within the bore of said sleeve comprising a base member adapted to rest against the end of said arbor, a spring on said base member and extending toward the side thereof opposite the arbor, and a head member including an end piece against which said spring thrusts and spaced limbs rigid with said end piece and at opposed sides of said base member including friction means for maintaining pressure against oppositely disposed portions of an internal surface of said bore.

5. In a grinder to be applied to a centering arbor when grinding a valve seat or the like, coaxial with the arbor, the combination with a sleeve having a bore fitting freely over said arbor and a rotary grinder mounted for rotation on said sleeve, of a lifter device received within the bore of said sleeve comprising a base member adapted to be rested against the end of said arbor and be fixed against rotation relative thereto, a spring on said base member and extending toward the side thereof opposite the arbor, and a head member including an end piece against which said spring thrusts and spaced limbs rigid with said end piece and at opposed sides of said base member including friction means for maintaining pressure against oppositely disposed portions of an internal surface of said bore.

6. The combination as specified in claim 5 wherein said base member includes a bit for entry into a slot in said arbor.

7. In a grinder to be applied to a centering arbor when grinding a valve seat or the like, coaxial with the arbor, the combination with a sleeve having a bore telescopically fitting the arbor, a rotary grinder mounted for rotation on said sleeve and having a driving head at its upper end adapted to be rotated and pressed downwardly intermittently to bring a grinding face of the rotary grinder into contact with a seat being ground, of a lifter device in said bore comprising a base member adapted to rest against the end of said arbor, a compression spring on said base member, and a head member including a surface against which said compression spring thrusts to support the weight of said grinder and spaced limbs rigid with said surface and at opposed sides of said base member having friction means for maintaining pressure against oppositely disposed portions of an internal surface of said bore sufficient to effect a compression of said spring in response to forcing of said sleeve to bring said rotary grinder into contact with said seat, said compression spring being adapted to lift the rotary grinder and support it in spaced relation to said seat when force on said sleeve is discontinued.

8. The combination as specified in claim 7, and means for precluding rotation of said base member relative to said arbor.

9. The combination as specified in claim 7 wherein said base member is slidably situated between the spaced limbs of said head member.

10. In combination, an arbor, a sleeve having a bore telescopically fitting said arbor, and a lifter device received within the bore of said sleeve comprising a base member to be rested against said arbor, spring means on said base member and a head member including a surface against which said spring means thrusts and spaced limbs rigid with said surface and at opposed sides of said base member including friction means for maintaining pressure against oppositely disposed portions of an internal surface of said bore sufficient to effect a compression of said spring means in response to forcing of said sleeve upon and toward said arbor.

11. The combination as specified in claim 10, and means for precluding rotation of said lifter device relative to said arbor.

12. A lifter device to be received within the bore of a sleeve telescopically mounted upon an arbor, comprising a base member to be rested against said arbor, spring means on said base member and a head member including a surface against which said spring means thrusts to support said sleeve on said arbor, said head member also including spaced limbs rigid with said surface and at opposed sides of said base member having friction means for maintaining pressure against oppositely disposed portions of an internal surface of said bore sufficient to effect a compression of said spring means in response to forcing of said sleeve upon and toward said arbor.

13. The combination as specified in claim 12, and means for precluding rotation of said lifter device relative to said arbor.

References Cited in the file of this patent

UNITED STATES PATENTS

| | | |
|---|---|---|
| 2,252,223 | Walraven | Aug. 12, 1941 |
| 2,525,119 | Dunn | Oct. 10, 1950 |
| 2,611,223 | Enge | Sept. 23, 1952 |